Patented June 30, 1925.

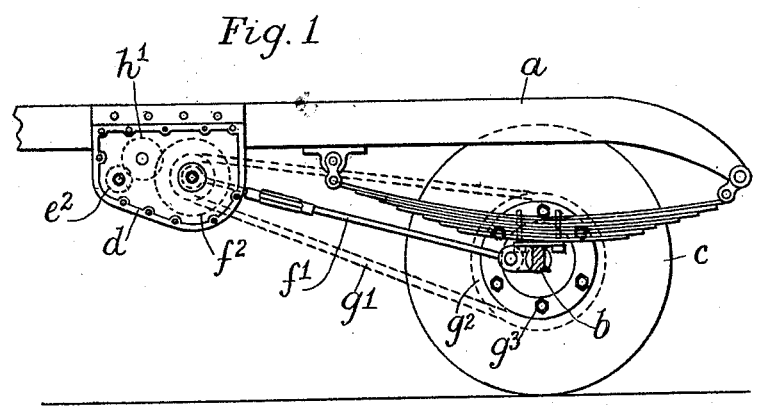
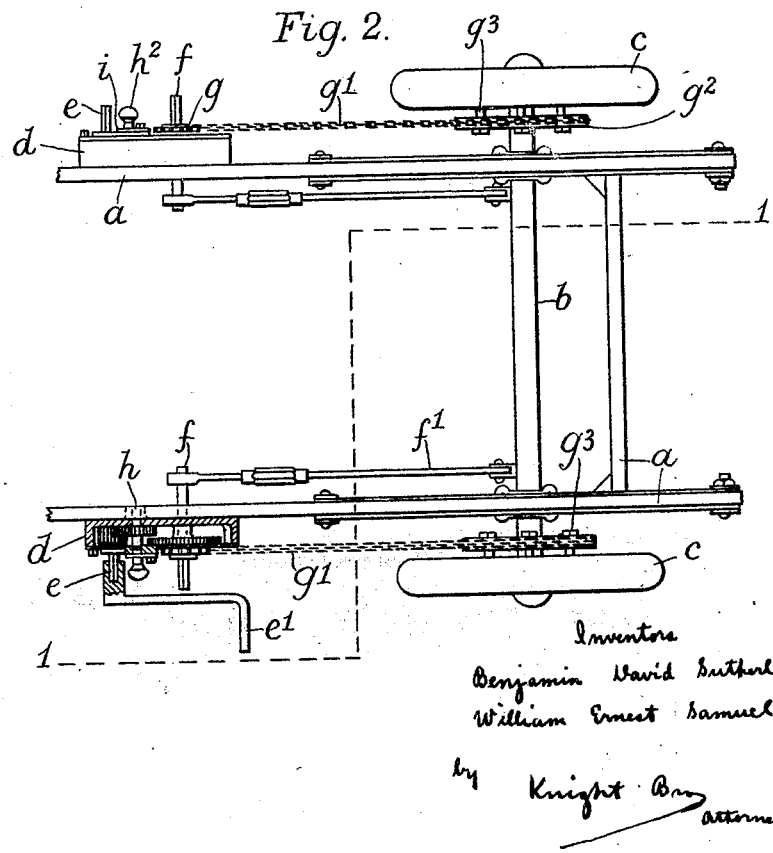

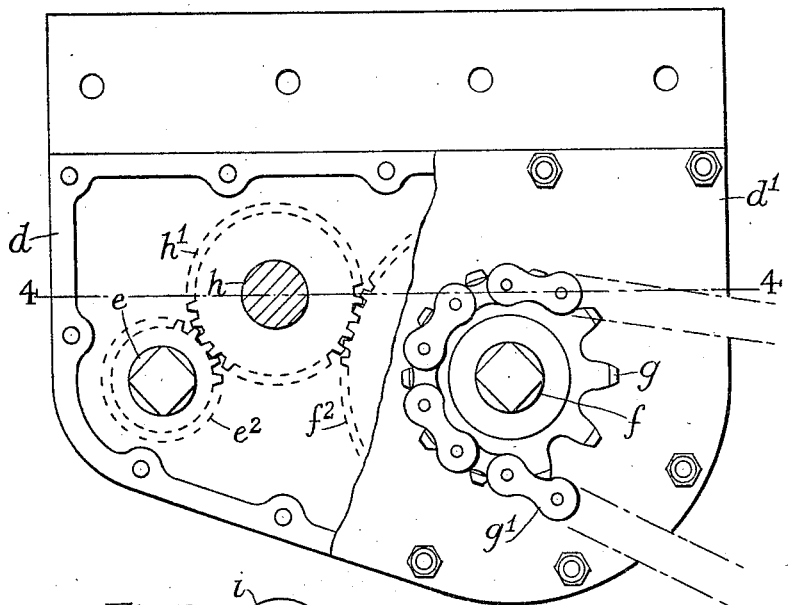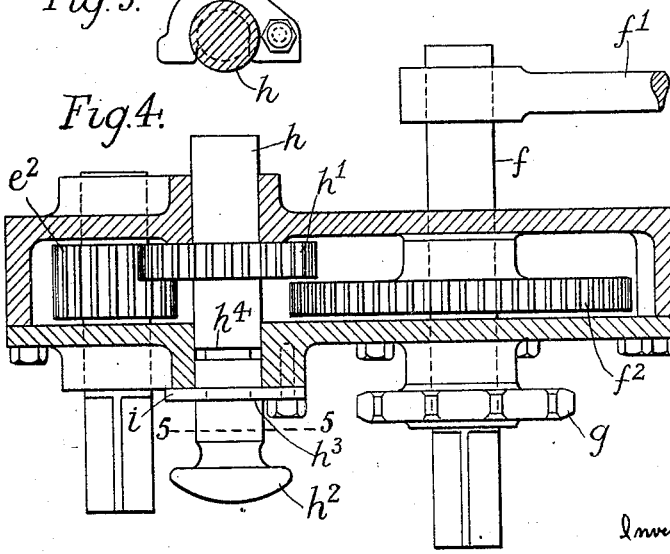

1,543,958

UNITED STATES PATENT OFFICE.

BENJAMIN DAVID SUTHERLAND AND WILLIAM ERNEST SAMUEL, OF LLANELLY, WALES.

TRAILER FOR VEHICLES.

Application filed March 20, 1924. Serial No. 700,705.

*To all whom it may concern:*

Be it known that we, BENJAMIN DAVID SUTHERLAND, a subject of the King of Great Britain, residing at 76 Coleshill Terrace, Llanelly, South Wales, and WILLIAM ERNEST SAMUEL, a subject of the King of Great Britain, residing at 34 New Road, Llanelly, South Wales, have invented a new and useful Improvement in Trailers for Vehicles, of which the following is a specification.

The invention relates to trailers which are usually drawn by a motor, but which may be, in some cases, attached to the rear of a horse-drawn vehicle. Such trailers have a turntable or Ackermann steering at the front, a towing bar connected to the front axle and a fixed rear axle.

The object of the present invention is to construct an improved manually operated trailer which may be readily driven and steered into any desired position after it has been disconnected from the towing vehicle.

The front part of the trailer is constructed as heretofore with means for steering and towing the vehicle. As such means are well known and in common use they are not herein shown and described and form no part of the present invention.

According to the present invention, the rear part of the vehicle is provided with a manually operated driving shaft and a counter-shaft mounted in suitable bearings. The driving shaft is connected by suitable gearing with the counter-shaft, which latter is also provided with a chain wheel. A second chain wheel is fixed to the rear wheel and a chain connects the two chain wheels. The gearing is so arranged that a man or men can readily move the vehicle either backwards or forwards after it has been disconnected from the towing vehicle, whilst another man can steer the trailer by means of the towing bar.

The invention is illustrated in the accompanying drawings in which Fig. 1 is a side view of the rear part of the chassis of a trailer partly in elevation and partly in section on the line 1—1 of Fig. 2, and Fig. 2 is a plan thereof.

Fig. 3 is a side elevation of part of the gearing with the outer face of the casing omitted and Fig. 4 is a horizontal section on the line 4—4 of Fig. 3, the chain being omitted.

Fig. 5 is a section on the line 5—5 of Fig. 4 showing an intermediate shaft and locking plate employed therewith for retaining the toothed gear wheels in an operative or inoperative position.

$a$ is a part of the chassis of the trailer. $b$ is the rear axle and $c\ c$ are the rear wheels.

On each side of the chassis is fixed a casing $d$ having a cover $d^1$. The casing and cover are provided with bearings for the driving shaft $e$, counter-shaft $f$ and intermediate shaft $h$. The inner end of the counter-shaft $f$ carries an adjustable radius rod $f^1$ pivoted at its rear end to the back axle $b$ to provide for adjustment of chain $g^1$. The driving shaft $e$ and counter-shaft $f$ are each shown with a square at the outer ends to receive a cranked handle $e^1$ by which either may be rotated. The driving shaft $e$ carries a toothed pinion $e^2$. Between the driving shaft $e$ and counter-shaft $f$ is a sliding shaft $h$ having a carrying pinion $h^1$ keyed thereon. The pinion $h^1$ is always in gear with the toothed pinion $e^2$. The carrying pinion $h^1$ is adapted to slide axially with its shaft $h$ when the handle $h^2$ is pulled so that the toothed pinion $h^1$ meshes with the toothed wheel $f^2$ fixed on the counter-shaft $f$. On the outer end of the counter-shaft $f$ is fixed a chain wheel $g$, which by means of a chain $g^1$ gives motion to a toothed wheel $g^2$ connected to a rear wheel $c$ of the trailer by means of distance pieces and bolts $g^3$. The gearing in casing $d$ and chain wheels $g$ and $g^2$ may be of any desired ratio.

When it is desired to drive the trailer, the plate $i$ pivoted to the cover $d^1$ of the casing $d$ is raised from a groove $h^3$ in the sliding shaft $h$. This latter is then moved axially outwards until its toothed pinion $h^1$ meshes with the gear wheel $f^2$, when the plate $i$ is dropped and enters the groove $h^4$ in the sliding shaft $h$, thereby retaining the toothed pinion $h^1$ and gear wheel $f^2$ in gear. The gearing having been put into action on both sides of the trailer, two men may simultaneously drive the gearing on each side of the trailer by means of crank handles such as $e^1$ and thereby drive the trailer forwards or backwards. The towing bar, (not shown)

after it has been disconnected from the tractor, will be available for steering the trailer.

When the trailer is being towed, it is preferable to move the sliding shaft $h$ axially so that its pinion $h^1$ is not in gear with the gear wheel $f^2$. The pinion $h^1$ is retained in its inner position, as shown by means of the pivoted plate $i$ entering the groove $h^3$ in the shaft $h$.

The fore part of the trailer is not shown as it is of ordinary construction and forms no part of the present invention. The handle $e^1$ is used on the shaft $e$ when the trailer is heavily loaded but it is used on the counter-shaft $f$ when the trailer is empty or lightly loaded.

What we claim as our invention is:—

1. A trailer having in combination, a chassis, a casing carried by the chassis, a driving shaft adapted to be rotated by a crank handle, a counter-shaft, and a sliding intermediate shaft mounted in bearings in the casing, toothed gearing adapted to connect the three said shafts, two grooves in the intermediate shaft, a pivoted plate adapted to engage with either groove in the intermediate shaft, a handle on the intermediate shaft, a chain wheel on the counter-shaft, rear carrying wheels for the trailer, a chain wheel fixed to a rear carrying wheel, and a chain connecting the two chain wheels, substantially as set forth.

2. A trailer having in combination a chassis, a casing carried by the chassis, a driving shaft adapted to be rotated by a crank handle, a counter-shaft, and a sliding intermediate shaft mounted in bearings in the casing squares on the ends of the driving shaft and counter shaft, toothed gearing adapted to connect the three said shafts, two grooves in the intermediate shaft, a pivoted plate adapted to engage with either groove in the intermediate shaft, a handle on the intermediate shaft, a chain wheel on the counter-shaft, rear carrying wheels for the trailer, a chain wheel fixed to a rear carrying wheel, a chain connecting the two chain wheels, a back axle and a radius rod pivoted at its rear to the back axle and carried at its front end by the counter-shaft, substantially as set forth.

3. A trailer having in combination a chassis, a casing carried by the chassis, a driving shaft, a counter-shaft and a sliding intermediate shaft mounted in bearings in the casing, squares on the ends of the driving shaft and counter-shaft, toothed gearing adapted to connect all three shafts, a chain wheel fixed on the counter-shaft, rear carrying wheels, a chain wheel fixed to a rear carrying wheel and a chain connecting the two chain wheels, substantially as set forth.

In witness whereof we have hereunto set our hands.

BENJAMIN DAVID SUTHERLAND.
WILLIAM ERNEST SAMUEL.